A bottle sorter comprising an elongate horizontal primary conveyor, a feeder conveyor delivering bottles to the upstream portion of the primary conveyor, multiple delivery conveyors adjacent the downstream portions of the primary conveyor, and means selectively releasing the bottles on to the discharge conveyors. A feature of the invention is directed to the bottle gripping means which includes spring loaded toggle action when gripping and releasing the bottles.

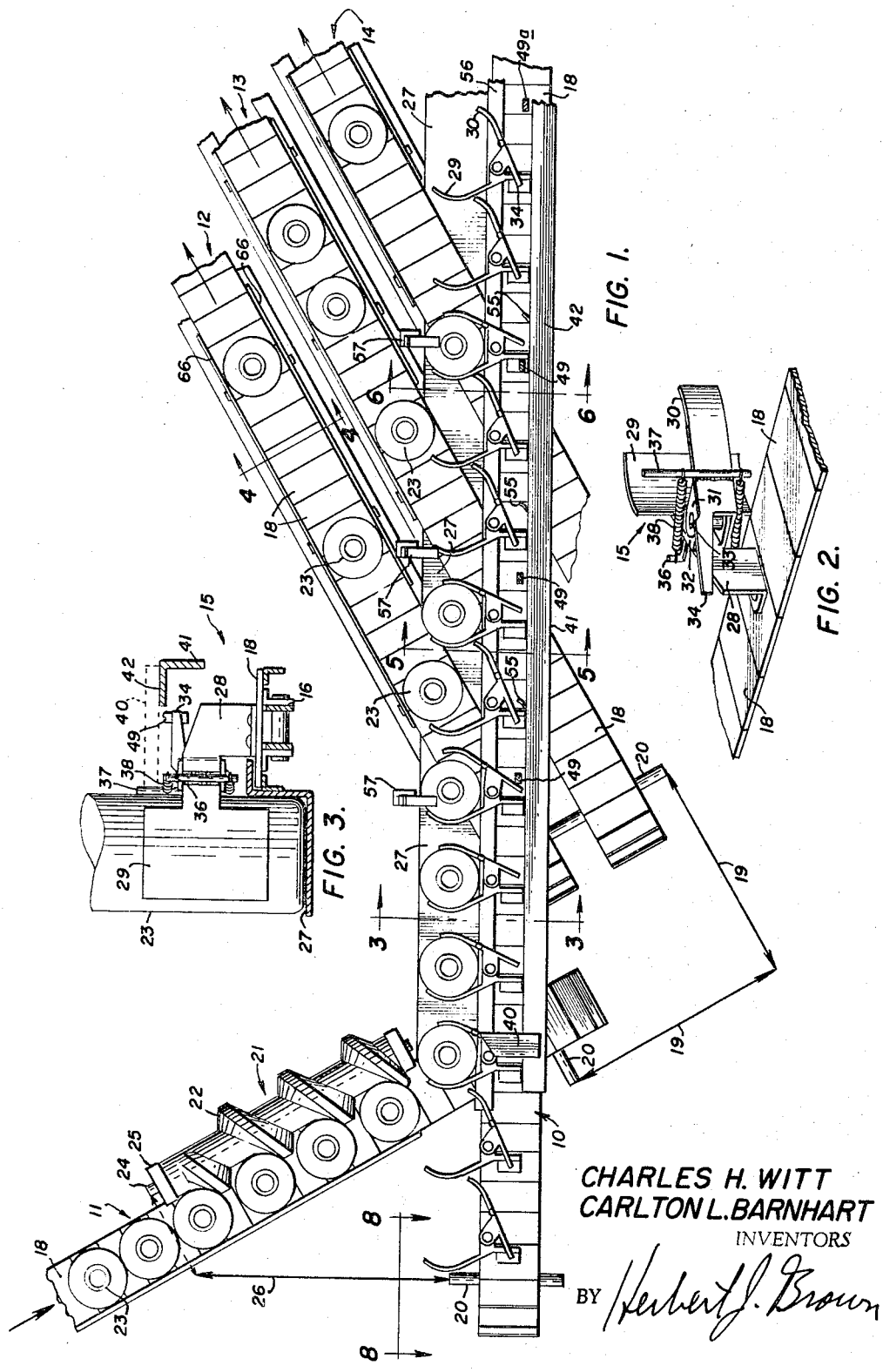

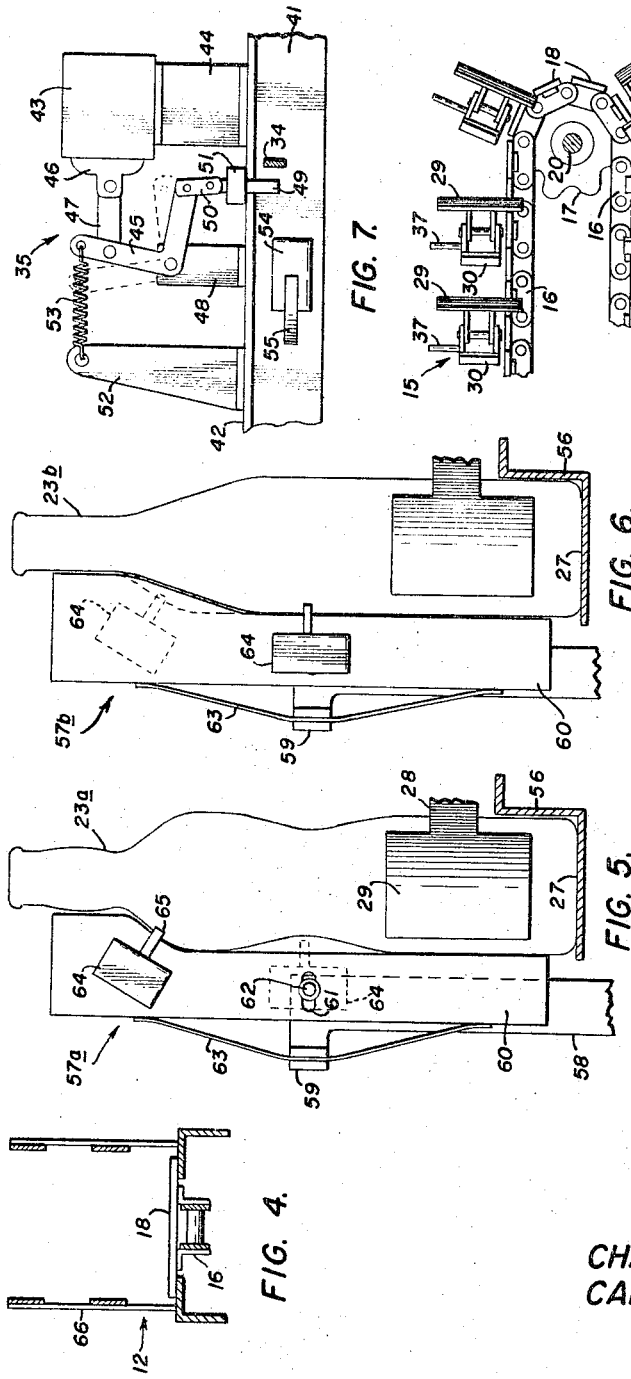
CHARLES H. WITT
CARLTON L. BARNHART
INVENTORS
BY
ATTOREY 3,327,848
BOTTLE SORTER
Carlton L. Barnhart and Charles H. Witt, both of 2928
W. Lancaster, Fort Worth, Tex. 76107
Filed June 24, 1965, Ser. No. 466,617
4 Claims. (Cl. 209—74)

This invention relates to a machine for sorting bottles of various sizes and shapes. The invention is particularly useful at bottling plants where returned bottles must be separated prior to refilling. Usually a bottler of soft drinks bottles several brands of drinks, each brand having its own distinctively shaped bottle.

An object of the invention is to provide a machine which will automatically separate a continuous flow of bottles according to size and shape.

Another object is to provide a bottle sorting machine which will act upon and separate bottles which may be vertically misaligned on a conveyor.

Another object is to provide means spacing mixed bottles so that each is synchronized with and received in a moving gripping device on a conveyor.

A further object is to provide, in a bottle sorting machine of the described class, means assuring the open position of all moving gripping devices when receiving bottles.

These and other objects of the invention will become apparent from the following description and the accompanying drawings, wherein:

FIGURE 1 is a schematic plan view of a bottle sorting machine according to the invention with certain parts removed to illustrate certain features which would otherwise be obscured.

FIGURE 2 is a perspective view of one of the bottle gripping devices on a length of the primary conveyor.

FIGURE 3 is an enlarged vertical sectional view taken on line 3—3 of FIGURE 1, and showing the gripping device engaging the lower portion of a bottle.

FIGURE 4 is a vertical sectional view taken on line 4—4 of FIGURE 1 and shows a cross section of one of the bottle discharge chutes.

FIGURE 5 is a vertical sectional view taken on line 5—5 of FIGURE 1 and showing a sensing mechanism applied to a bottle of a particular shape.

FIGURE 6, taken on line 6—6 of FIGURE 1, is like FIGURE 5, but shows another sensing device applied to a bottle of a different shape.

FIGURE 7 is a fragmentary elevational view of a portion of the stationary horizontal support and one of the solenoid mechanisms mounted thereon, and FIGURE 8 is a broken elevational view of one end of the primary conveyor.

As shown in FIGURE 1, there is a primary conveyor 10, a feeder conveyor 11, and first, second and third discharge conveyors 12, 13 and 14. While only three discharge conveyors are shown, any reasonable number may be employed depending on the number of shapes of bottles to be sorted. Except for the addition of bottle gripping devices 15 on the primary conveyor 10, all conveyors are identical except for length. Each conveyor, 10–14, is comprised of an endless chain 16 (FIGURE 8) mounted on sprockets 17, and the links of the chain have flat segments 18 on their outer areas. All conveyors 10–14 are horizontal and the segments, when positioned along the upper portions of the conveyors, define horizontal planes. The feeder conveyor 11 is at an acute angle with reference to and passes beneath the upstream portion of the primary conveyor 10. Similarly, the discharge conveyors, 12–14, are at acute angles with reference to the downstream portion of the primary conveyor 10 and extend therebeneath. The feeder conveyor 11 and the discharge conveyors 12–14 are on the same side of the primary conveyor 10.

Schematically shown in FIGURE 1, the feed and discharge conveyors 11–14 are mechanically connected to each other so as to be driven by a single source, not shown, and which connections are indicated by connected arrows 19 to extending shafts 20 on which certain of the conveyor sprockets 17 are mounted. The indicated connections may be shafts and gears, flexible shafts or other suitable drive means.

Along one side of the feeder conveyor 11 and extending over the adjacent edges of the segments 18 there is a worm 21, the flight 22 of which is shaped to space unassorted bottles 23 as they approach the primary conveyor 10. The worm 21 is rigidly mounted on a shaft 24 and the shaft is journaled in blocks 25 at the ends of the worm. The shaft 24 is driven by a mechanical connection 26 (arrow, FIGURE 1) with the shaft 20 at the upstream end of the primary conveyor 10.

Stationary plates 27 are mounted along side the primary conveyor 10 between the feeder conveyor 11 and discharge conveyors 12–14, the upper surfaces of which plates are level with the upper surfaces of said feeder and discharge conveyors.

The gripping mechanisms 15 are mounted at spaced intervals on the outer surface of the primary conveyor 10. As best shown in FIGURE 2, each gripping mechanism 15 is comprised of a bracket 28 which extends laterally from the conveyor 10 where it is arcuately shaped about a vertical axis to provide a bottle engaging pocket 29. Pivotally mounted on the bracket 28 there is a gripping arm 30, the outer or extending end of which is curved and positioned in a direction to engage bottles 23 received from the feeder conveyor 11. The arm 30 has upper and lower lateral ears 31 which overlap corresponding ears 32 on the bracket 28 and a vertical hinge pin 33 extends through respective overlapping pairs of said ears.

Integral with the gripping arm 30 there is an inwardly extending finger 34 for coaction with solenoid mechanisms 35, FIGURE 7, to be described.

Separate vertical pins 36 and 37 are secured, as by welding, on the brackets 28 and arms 30, the upper and lower ends of which pins have upper and lower tension springs 38, 39 connected therebetween. The pins 36, 37 are located relative to their respective hinge pins 33 so that the springs 38, 39 impart a toggle action to the arms 30; that is, the springs hold the arms 30 in either an open or closed position when actuated by the fingers 34. The pins 37 on the arms 30 extend above said arms for coaction with a stationary cam 40 above the primary conveyor 10 at the latter's junction with the feeder conveyor 11. As shown only in FIGURE 1, the rise of the cam 40 is such that contact of the pins 37 move the arms 30 to engage the approaching bottle 23, but the toggle action of the springs 38, 39 cause the pins to clear the end of the cam.

The cam 40 is mounted on a horizontal frame 41 which runs lengthwise and above the center portion of the primary conveyor 10. Downstream of the cam 40 there is a platform 42 on which the solenoid mechanisms 35 are mounted. As shown in FIGURE 7, each solenoid mechanism 35 includes a solenoid 43 mounted on a support 44. Opposite each solenoid 43 there is a bell crank 45, the upper arm of which is connected with the armature 46 of the solenoid by a pivoted link 47. The corner of the bell crank is pivotally mounted on a bracket 48 on the platform 42 and the lower arm of the bell crank is connected with a vertical pin 49 by a pivotally connected link 50. The pin 49 is slidably mounted in a guide 51 and extends below the platform 42. Another bracket 52 extends upwardly from the platform 42 and is opposite and spaced from the first bracket 48 and the solenoid 43. A tension spring 53 between the upper end of the bell crank 45 and the last described bracket 52 normally maintains the vertical pin 49 in a raised position so that the finger 34 of the bottle gripping device 15 normally passes therebeneath. However, the solenoids 43 are of the holding type and require a switch downstream to release the solenoid. Accordingly, there is a microswitch 54 on the frame 41 and which switch has a projecting spring actuator 55 in the path of the finger 34 on the bottle gripping mechanism 15. In FIGURE 7 it is to be noted that the finger 34, shown in cross section, moves from right to left. Downstream of the last discharge chute 14 there is a fixed pin 49a in the path of the fingers 34 whereby all gripping mechanisms are open when they reach the upstream end of the primary conveyor 10. The movable pins 49 are located so as to contact the fingers 34 and open the arms 30 as the bottles 23 slide onto the discharge conveyors 12–14.

An outwardly flanged vertical wall 56 is integral with the near edges of the stationary plates 27 and which wall spans the discharge conveyors 12–14. In operation, the bottles are gently pressed against the wall 56 by action of the sensing mechanisms, generally designated by the numeral 57. To differentiate between the two sensing mechanisms illustrated in FIGURES 5 and 6, they are referred to as 57a and 57b. Both have the same parts which carry the same reference numbers, but differ as to shape and location of some of the parts. As shown in FIGURE 1, the sensing mechanisms 57 are located adjacent the outer edges of the stationary plates 27 at the downstream ends thereof for acting on the bottles 23 as they slide onto the discharge conveyors 12–14.

The sensing mechanisms 57a and 57b are exemplary and each is activated only by a bottle 23a or 23b. It is to be understood that additional sensing mechanisms and additional discharge chutes, such as 12–14, are to be employed according to the number of shapes and sizes of bottles to be sorted.

Each sensing mechanism includes a vertical support 58 and a lateral arm 59 at its top directed away from the bottle 23 to be acted upon. A generally vertical contact bar 60 is pivotally mounted intermediate its ends near the top of the support 58. Means urging the contact bar against the bottle 23 is a transverse slot 61 in the bar, a pin 62 extending through the slot and secured to the support 58, and a leaf spring 63 mounted intermediate its ends on the support arm 59 with the extending ends of the spring bearing against the upper and lower portions of the contact bar. The upper edge of the bar 60 is contoured to contact the neck of the bottle 23. This has to do with stabilizing the moving bottle and in some cases, for example FIGURE 5, provides an area on which to locate a microswitch 64, the spring feeler or actuator 65 of which is positioned to contact the shoulder of a particularly shaped bottle 23a. In FIGURE 6, the shoulder of the bottle 23b is low, but this bottle has a straight wall; accordingly, the switch 64 is positioned relatively low on the contact bar 60 and the switch actuator 65 is positioned to contact the wall of the bottle. The switches 64 of the two sensing mechanisms 57a and 57b are shown relative to each other by means of dotted lines in FIGURES 5 and 6. The switches 64 of the sensing mechanisms 57 are electrically connected with their respective solenoid mechanisms 35. It is pointed out that two or more switches 64 may be mounted on one contact bar 60 and connected in series for increasing the possible number of shapes of bottles to be sorted.

In operation, the bottles to be sorted are placed on the feeder conveyor 11 which moves toward the primary conveyor 10. The worm 21 spaces the bottles which are then received in the open gripper mechanism 15, after which the bottles 23 are moved along the stationary plate 27 until acted upon by a switch or switches 64 on a contact bar 60. The closing of the switch 64 actuates the solenoid mechanism 35 and causes its pin 49 to depend. Contact of the pin 49 with the finger 34 of the gripper mechanism 15 opens the arm 30 at a time when the bottle is on a discharge conveyor 12–14, and the bottle then moves outwardly on the conveyor. As explained in the foregoing, the finger 34 subsequently contacts the switch 54 downstream of the pin 49 and rests the solenoid mechanism 35. The chutes 12–14 may have side panels 66 for guiding the bottles, and an example of which side panels is shown in FIGURE 4.

The invention is not limited to the exemplary construction herein shown and described, but may be made in various ways within the scope of the appended claims.

What is claimed is:

1. A bottle sorter comprising an elongate horizontal primary conveyor, a feeder conveyor having a delivery portion adjacent an upstream portion of said primary conveyor, delivery conveyors adjacent downstream portions of said primary conveyor, bottle gripping means carried by said primary conveyor receiving bottles from said delivery portion of said feeder conveyor and moving them to said delivery conveyors, said bottle gripping means including brackets secured to said primary conveyor, a bottle receiving pocket rigid with each said bracket, an arm opposite said pocket, a pivot pin connecting said arm with said bracket, and a tension spring connecting said bracket with said arm, said spring being located relative to said pin to impart a toggle action to said arm and means selectively releasing said bottles onto said dicharge conveyors according to size and shape.

2. A bottle sorter comprising an elongate horizontal primary conveyor, a feeder conveyor having a delivery portion adjacent an upstream portion of said primary conveyor, delivery conveyors adjacent downstream portions of said primary conveyor, bottle gripping means carried by said primary conveyor receiving bottles from said delivery portion of said feeder conveyor and moving them to said delivery conveyors, means selectively releasing said bottles onto said discharge conveyors according to size and shape, wherein said means selectively releasing said bottles includes a sensing mechanism located relative to each said discharge conveyor, each said sensing mechanism including an electric switch, the actuator of which is positioned to contact a surface of a particularly shaped bottle as it is moved by said primary conveyor and wherein said switch is mounted on a generally vertical resiliently supported contact bar including spring means normally urging said bar against the bottle passing thereby.

3. A bottle sorter comprising an elongate horizontal primary conveyor, a feeder conveyor having a delivery portion adjacent an upstream portion of said primary conveyor, delivery conveyors adjacent downstream portions of said primary conveyor, bottle gripping means carried by said primary conveyor receiving bottles from said delivery portion of said feeder conveyor and moving them to said delivery conveyors and means selectively releasing said bottles onto said discharge conveyors according to size and shape, said bottle gripping means including brackets secured to said primary conveyor, a bottle receiving a pocket rigid with each said bracket, an arm opposite said pocket, a pivot pin connecting said arm with said bracket, and a tension spring connecting said bracket with said arm, said spring being located relative to said pivot pin to impart a toggle action to said arm and a solenoid mechanism for opening said bottle gripping means, said solenoid mechanism including a solenoid and a movable pin operated thereby, said movable pin being located to contact and open said arm relative to said bottle receiving pocket.

4. A bottle sorter comprising an elongate horizontal primary conveyor, a feeder conveyor having a delivery portion adjacent an upstream portion of said primary conveyor, delivery conveyors adjacent downstream portions of said primary conveyor, bottle gripping means carried by said primary conveyor receiving bottles from said delivery portion of said feeder conveyor and moving them to said delivery conveyors, means selectively releasing said bottles onto said discharge conveyors according to size and shape, said bottle gripping means including brackets secured to said primary conveyor, a bottle receiving pocket rigid with each said bracket, an arm opposite said pocket, a pivot connecting said arm with said bracket, and a tension spring connecting said bracket with said arm, said spring being located relative to said pin to impart a toggle action to said arm, a projecting pin on the arm of each said bottle gripping means, and a stationary cam located opposite said feeder conveyor and also located to contact said projecting pin on said arm whereby to close said arms relative to their respective pockets.

References Cited

UNITED STATES PATENTS

| | | | |
|---|---|---|---|
| 2,371,748 | 3/1945 | Fedorchak. | |
| 2,606,657 | 8/1952 | Berthelsen | 209—75 |
| 2,627,346 | 2/1953 | Stone | 209—74 |
| 2,881,918 | 4/1959 | Cunha | 209—90 |
| 2,987,179 | 6/1961 | Allgeyer et al. | 209—74 X |
| 3,073,444 | 1/1963 | Bielinski et al. | 209—74 |
| 3,080,659 | 3/1963 | Wolford | 209—88 X |
| 3,110,400 | 11/1963 | Early | 209—74 |

M. HENSON WOOD, JR., *Primary Examiner.*

J. N. ERLICH, *Assistant Examiner.*